April 18, 1939.     C. H. WIDMAN     2,154,596
METHOD OF FORMING VEHICLE DOORS AND MOLDING THEREFOR
Filed March 2, 1936     3 Sheets-Sheet 1
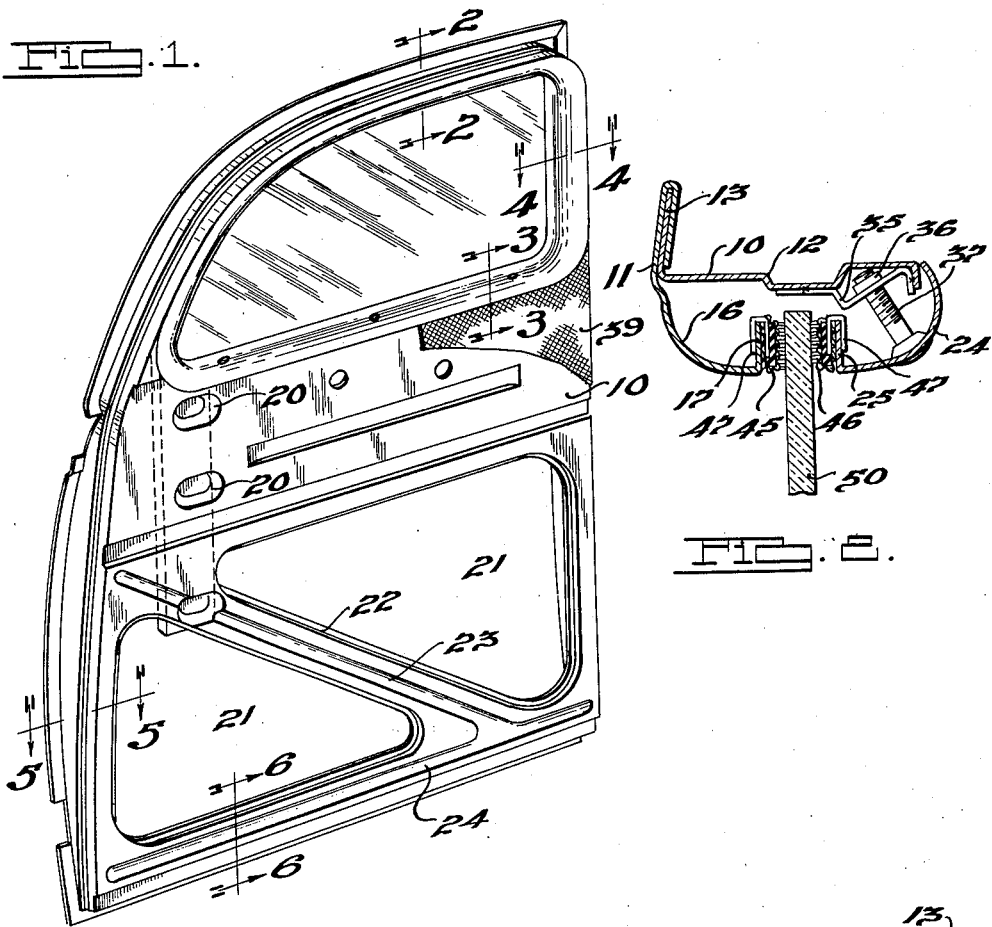
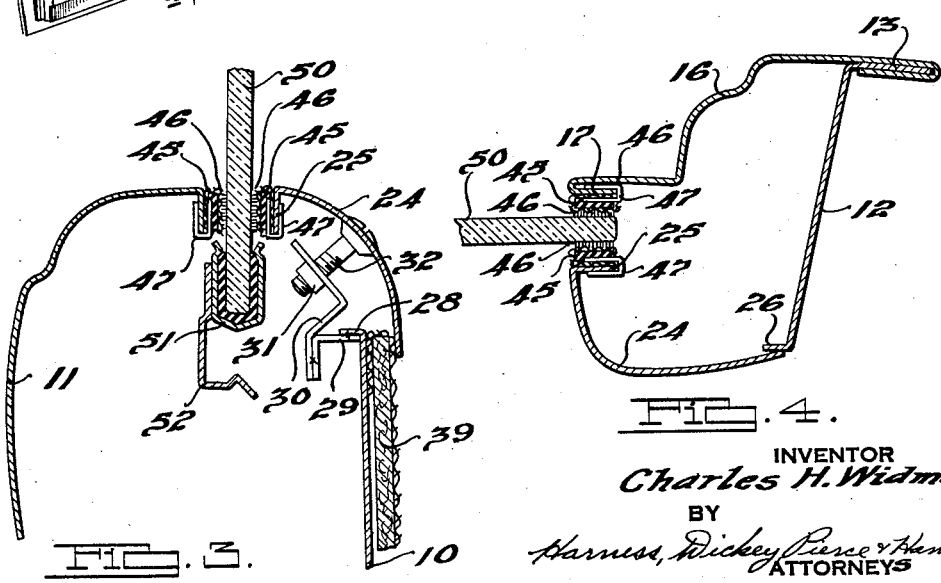
INVENTOR
Charles H. Widman
BY
Harness, Dickey, Pierce & Hann.
ATTORNEYS April 18, 1939.  C. H. WIDMAN  2,154,596
METHOD OF FORMING VEHICLE DOORS AND MOLDING THEREFOR
Filed March 2, 1936  3 Sheets-Sheet 2

INVENTOR
Charles H. Widman.
BY
Harness, Dickey, Pierce & Henn.
ATTORNEYS.

April 18, 1939. C. H. WIDMAN 2,154,596

METHOD OF FORMING VEHICLE DOORS AND MOLDING THEREFOR

Filed March 2, 1936 3 Sheets-Sheet 3

INVENTOR
Charles H. Widman.
BY
Harness, Dickey, Pierce & Hann.
ATTORNEYS.

Patented Apr. 18, 1939

2,154,596

UNITED STATES PATENT OFFICE 2,154,596

METHOD OF FORMING VEHICLE DOORS AND MOLDING THEREFOR

Charles H. Widman, Detroit, Mich., assignor to The Murray Corporation of America, a corporation of Delaware Application March 2, 1936, Serial No. 66,542

10 Claims. (Cl. 29—152)

This application relates to sheet metal vehicle doors and a novel and improved method for forming the same. More particularly it relates to a novel form of sheet metal door construction of improved appearance and to a method of manufacturing the improved door construction which results in a substantial saving of material over methods heretofore known.

It is a primary object of the present invention to provide a door construction in which the inner panel, of which the door is composed, is preformed around its marginal edge to provide the entire jamb face of the door and at the time the panel is blanked out, the portion of the panel around the window opening is preformed to a curvature substantially that of the garnish molding which is used with the door. This preformed portion of the panel is then severed from the panel and may subsequently be removably mounted thereon, thus affording a substantialy saving in metal.

In conventional door constructions now in common use, it is practically essential that a removable garnish molding or suitable finish element be provided around the window opening in order to permit the installation of the window in the door after the door has been assembled and also to permit replacement of the window when such is necessary. The present invention contemplates the formation of this removable garnish molding element from the same sheet from which the inner door panel is formed, and, as will hereinafter become clear, the garnish molding and door panel are simultaneously formed from an integral sheet of material and subsequently separated to provide independent elements.

Heretofore the garnish moldings used with door structures of this type have been formed from a length of rolled section and hence have necessarily been of substantially uniform width. If garnish moldings were stamped from a sheet of metal it would be clear that the waste of metal would be so great as to render the process impractical from a commercial standpoint. From the following disclosure it will be clear that garnish moldings may be formed by the method of the present invention from the material around the window opening which would otherwise normally be wasted. Further, it will be seen that the garnish moldings thus formed may have a widely varying cross sectional configuration at different points around the window opening.

Another object of the invention resides in the novel method of forming door rail structure surrounding the window opening, in which particularly simple, novel and effective means are provided for positioning the glass run channel with respect to the marginal frame of the door.

Still further the present invention contemplates the novel method of forming an outer panel, which has the finish molding around the window opening preformed therein and formed as an integral part thereof, and which finish material is provided with an inwardly extending flange surrounding the window opening, which flange is spaced from the jamb face portion of the door and entirely out of contact therewith.

Many other and further objects and advantages of the present invention will become clearly apparent from the following specification when considered in connection with the accompanying drawings forming a part thereof In the drawings:

Figure 1 is a perspective view, with portions broken away, illustrating a vehicle door embodying the improvements of the present invention;

Figure 2 is an enlarged, transverse, sectional view, taken substantially on the line 2—2 of Figure 1, showing in detail the construction of the door rail at the top of the window opening;

Figure 3 is an enlarged, sectional view, taken substantially on the line 3—3 of Figure 1, illustrating in detail the improved door construction at the bottom of the window opening;

Figure 4 is an enlarged, transverse, sectional view, taken substantially on the line 4—4 of Figure 1, illustrating in detail the construction of the door adjacent the rear edge of the window opening;

Figure 5:
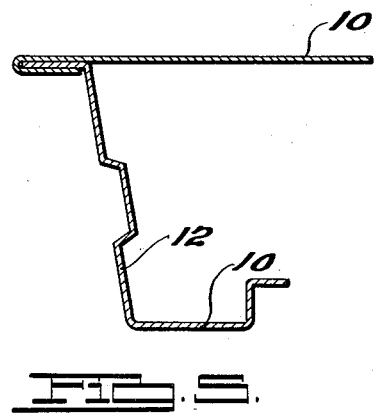
Figure 5 is an enlarged, transverse, sectional view, taken substantially on the line 5—5 of Figure 1, illustrating in detail the manner in which the mating panels of the door are secured together.
Figure 6:
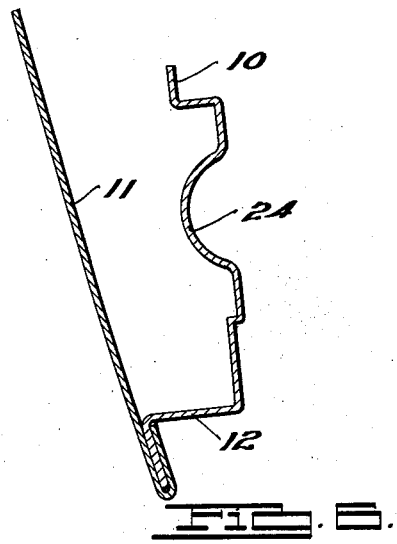
Figure 6 is an enlarged, transverse, sectional view, taken substantially on the line 6—6 of Figure 1, illustrating in detail the manner in which the lower marginal edges of the two panels are secured together to form the improved door.

With more particular reference to the accompanying drawings, the specific embodiment of the invention illustrated therein comprises a vehicle door construction which is made up of a pair of mating stampings 10 and 11, which are preformed to provide substantially spaced body portions and mating flanges around the outer marginal edges thereof. The inner stamping 10 is preferably preformed to provide a jamb face portion 12 extending completely around the periphery of the door as a whole, and it will be seen by reference to Figures 2 to 6 that this jamb face portion is further preformed to provide an overlap flange 13 lying substantially in the plane of the door as a whole and projecting outwardly from the jamb face portion 12. The jamb face portion as originally formed is wider in the portion thereof adjacent the window opening in order to obtain the advantages and benefits brought out in detail below.

The peripheral edge portion of the outer section 11 of paneling is preferably bent around this outwardly projecting flange 13 in order to form a door overlap of substantial thickness and to provide positive means for permanently securing the mating sections 10 and 11 together. The outer stamping 11 is preformed to provide a window opening of suitable configuration therein and it will be noted that the marginal edge portion of the outer stamping around this window opening is stamped to form a suitable integral molding structure 16 which extends inwardly from the general plane of the outer panel 11 substantially into the plane of the window opening. The marginal edge of this molding structure 16 around this window opening is bent to lie substantially in the plane of the window opening, thus providing a flange 17 which, as will hereinafter be more clearly seen, serves to support and guide the window glass as described in detail below. The inner stamping 10 in the portion below the window opening is preferably provided with suitable depressed portions 20 therein, serving to provide flat surfaces for mounting a glass run channel 19 interiorly of the door below the window opening.

A pair of sections of the inner panel are stamped out to provide substantially triangular openings 21, which leave therebetween a diagonally disposed reinforcing rib 22 which preferably has a depressed channel or groove extending therealong in order to increase the rigidity thereof. The groove 23 may communicate with a suitable depressed portion or groove 24 extending along the base of the panel in order to strengthen this portion. It will be appreciated that the removal of these triangular sections from the inner panel serve to lighten the door construction as a whole and that the reinforcing structure pressed into the metal serves to maintain substantially the desired strength and rigidity, the while saving a considerable amount of otherwise wasted material. It has been found preferable to flange panel 10 around these triangular openings to provide a structure of increased strength and rigidity.

Figure 7:
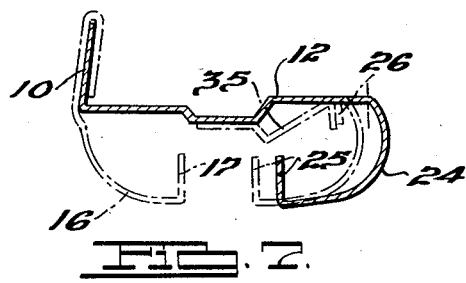
Figure 7 is an enlarged, transverse, sectional view of the portion of the door illustrated in Figure 2, illustrating diagrammatically the manner in which the inner panel is stamped to provide the necessary removably mounted garnish molding.
Figure 8:
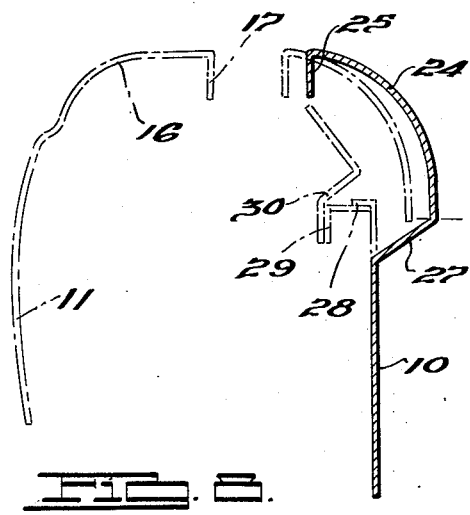
Figure 8 is an enlarged, sectional view, similar to Figure 3, illustrating the steps in the method by which the inner panel is preformed to provide the removably mounted garnish molding and the mounting therefor.
Figure 9:
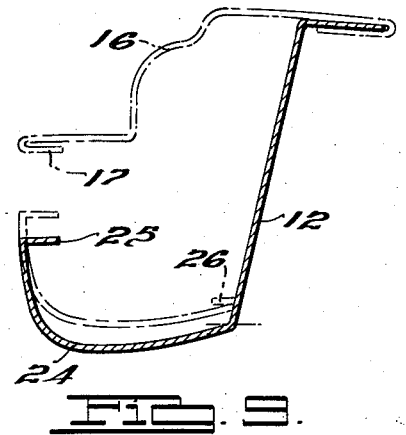
Figure 9 is a transverse, sectional view, similar to Figure 4, illustrating the steps in the formation of the inner panel of the door to provide the removable garnish molding element.
Figure 10:
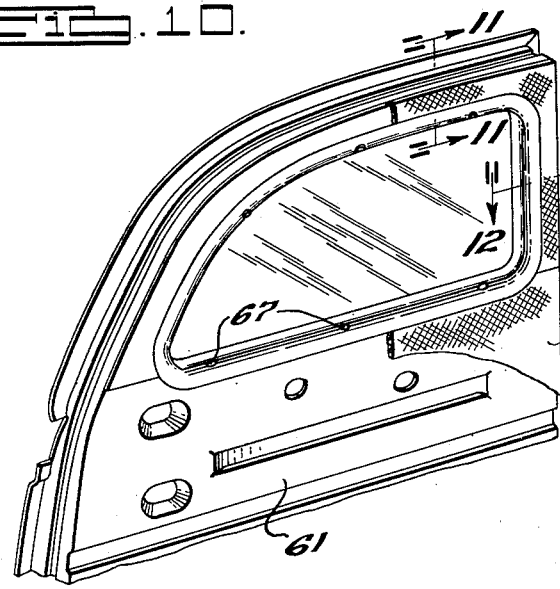
Figure 10 is a fragmentary, perspective view of a portion of the vehicle door, illustrating a modified form of the present invention.
Figure 11:
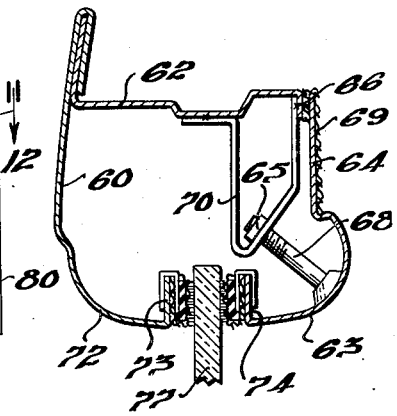
Figure 11 is an enlarged, transverse, sectional view, taken substantially on the line 11—11 of Figure 10, illustrating in detail the construction of the door rail at the top of the window opening in this modified form of the invention.

At the time the inner panel 10 is stamped, the metal of the panel around the window opening therein is preformed to provide a garnish molding element integral with the panel, and it will be appreciated that this integrally formed garnish molding element may be formed in the same dies which serve to stamp the panel 10 as a whole to form. It will be clear by reference to Figure 7 that the panel 10, at the time it is stamped, is bent to provide the jamb face portion 12 extending entirely around the periphery thereof, and it will be noted that this jamb face portion adjacent the window opening is considerably wider than is the jamb face in the completed door structure. At the time this stamping is formed, a garnish molding element 24 is formed around the window opening in the door and this garnish molding element 24, it will be seen, is provided in its inner edge with an outwardly projecting flange 25 lying parallel to the plane of the window opening. After the stamping operation has been completed, the garnish molding element 24 is cut off from the stamping 10 substantially along the dotted lines shown in Figures 7 to 9, thus providing a separate garnish molding element which extends completely around the window opening. The marginal edge of the stamping 10, which is now left around the window opening, is bent at right angles to provide an inwardly projected flange 26 around the sides and top of the window opening. At the lower marginal edge of the window opening, it will be seen that the marginal edge 27 of the inner stamping 10 will normally project outwardly from the surface of the sheet from which it is formed, due to the fact that the jamb face portion of the door formed around the window opening was substantially wider than the jamb face portion of the door formed around the remainder thereof. This outwardly projecting flange 27 is bent to lie substantially in the plane of the body of the panel 10 and has its extreme marginal edge bent inwardly at right angles to the body of the sheet to provide an inwardly projecting flange 28. A metallic strip 29 of generally angle section may have one leg thereof secured directly to this inwardly projecting flange 28. The other leg thereof serves to support a sheet metal strip 30 extending substantially the entire transverse width of the door and provides means for mounting the removable garnish molding upon the door.

As is seen in Figure 3, this strip 30 may be provided at suitable spaced points throughout its length with screw bosses 31 adapted to receive screws 32 for holding the garnish molding 24 in place.

A suitable strip 35 of rolled section extends along the forward side portion of the window opening and across the top thereof and is preferably permanently secured to the jamb face portion 12 of the inner panel on the inner side of the jamb face thereof. This strip 35 preferably has screw bosses 36 secured thereto at suitable spaced intervals which screw bosses serve to provide means for threadably receiving screws 37 which serve to hold the garnish molding in place and provide means for conveniently removably mounting the same. As is clearly seen by reference to Figure 3, the lower peripheral edge of the garnish molding may overlap the upper marginal edge of an inner trim panel 39 to aid in securing the trim panel in position on the inner panel of the door.

The specific embodiment of the invention illustrated in Figures 1 to 9 of the drawings illustrates a type of door construction in which regulator mechanism is utilized for the purpose of not only elevating a window to close the window opening, but in which the window, after it has been elevated, may be shifted slightly longitudinally substantially in its plane. In order to provide for such longitudinal shifting movement, the door rail along the rear side of the window opening is of relatively great depth.

From the foregoing, it will be appreciated that the window opening thus formed in the door will be defined upon the outboard side of the door by the molding structure 16 and that this molding structure 16 has an outwardly deflected flange 17 extending entirely around the window opening and lying substantially in the plane thereof. The window opening on the inboard side of the door will be defined by the removably mounted garnish molding element 24 which, as has been explained above, is secured in place by means of screws 32 and 37. It will be likewise seen that this garnish molding element 25 has an outwardly projecting flange 25 extending completely around the window opening, lying substantially parallel to the flange 17 and in spaced relation with respect thereto. These flanges 16 and 17 are each covered with continuous strips of resilient material 45 having fibrous material with a rather heavy nap 46 secured to the surface of the strip. These strips are held in place upon the surfaces of the flanges 17 and 25 by means of sheet metal spring clips 47 disposed at suitable spaced intervals along the flanges 17 and 25. Consequently, it will be apparent that a window 50 may be mounted in substantially the conventional manner in the door construction. This window is of a configuration adapted to completely close the window opening when in fully raised position and, as is conventional, has its lower edge secured in a suitable channel 51 which provides means for connecting a transversely extending bracket 52 providing means for connecting the conventional double arm regulator mechanism such as is used in windows of this type. It will be appreciated that the strips 45 which cover the flanges 17 and 25 will have the nap surfaces 46 thereof engaging the marginal edges of the window at substantially all sides thereof and will serve to provide resilient means for accurately positioning the window in its predetermined plane and yet permit relatively friction-free sliding movement of the window in the door.

In the modified form of the invention illustrated in Figures 10 to 13, inclusive, of the drawings, it will be appreciated that substantially the same generic principles are embodied as have been described in detail above. In this form of the invention the door construction shown comprises an inner panel 60 and an outer panel 61 secured together in their marginal edges in the conventional manner. At the time the inner panel is formed it is provided with a jamb face portion 62 which extends entirely around the periphery thereof and this jamb face portion, as has been described above, is formed somewhat wider in the portion adjacent the window opening. At the time this panel is formed, it is stamped to provide an area of paneling interiorly of the jamb face portion between the jamb face portion and the garnish molding portion which extends around the window; that is, the panel around the window opening is preformed to provide integrally therewith a garnish molding 63 and a substantially plain section of material 64 connecting the garnish molding portion 63 with the jamb face portion 62 of the door. After this panel has been thus preformed, it is severed along the point of juncture between this portion 64 and the jamb face portion of the door and the marginal edge of the jamb face portion of the panel is then bent to lie substantially in the plane of the body portion of the panel to provide a flange 66 which will mate with the plain strip 64 connected to the garnish molding member 63. This garnish molding structure 63 may be connected to the panel by means of suitable screws 67 along the lower edge of the window opening and along the upper edge of the window opening may be connected by means of suitable screws 68 which are threadably received in screw bosses 65 carried in suitable sheet metal brackets 70 secured to the inner surface of the jamb face portion 62 of the inner panel.

Figure 12:
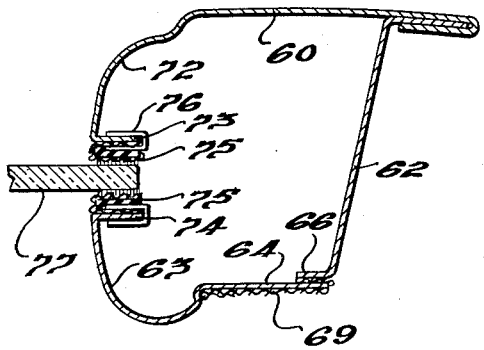
Figure 12 is an enlarged, transverse, sectional view, taken substantially on the line 12—12 of Figure 10, illustrating in detail the modified form of garnish molding construction and the manner in which it is secured to the adjacent paneling.
Figure 13:
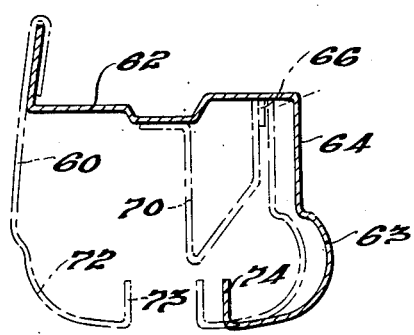
Figure 13 is a sectional view, similar to Figure 11, illustrating in detail the steps in the formation of the inner panel, showing the manner in which the removably mounted garnish molding element is formed therewith.

It will be seen that the outer panel 60 is preformed around the window opening to provide an integral molding structure 72 which at its marginal edge is provided with an out-turned flange 73 adapted to lie substantially in the plane of the window opening. Likewise the garnish molding element 63 is provided in its marginal edge with an out-turned flange 74 lying substantially parallel to the flange 73. As has been explained above, these two flanges extend substantially entirely around the window opening and may be covered by means of suitable continuous strips of composite material 75 secured thereto by means of suitable sheet metal spring clips 76 in order to provide means for retaining and guiding the window in its plane. As was the case in connection with the embodiment of the invention described above, the door structure as a whole is provided with a window 77 adapted for vertical movement within the door structure and, if desired, the window may be of the type which is adapted for transverse movement in its own plane when maximum elevational movement has been attained. Consequently, the rear door rail structure shown in Figure 12 is relatively deep in section, permitting a limited amount of rearward movement of the window 77 as a whole after it has been raised to completely elevated position.

If desired, the portion 64 of the garnish molding structure outwardly of the garnish molding 63 may be covered with suitable fabric inner trim material 69, adhesively secured thereto to provide a neat and attractive interior finish. As has been described above, the lower flange of the garnish molding structure 64 may overlap an inner trim panel 80 to aid in securing the same in position.

From the above described structure, it will be appreciated that the removable garnish molding element around the window, when formed in the manner taught by the present invention, may be of substantially varying widths and varying sectional shape at different points around the window opening, depending upon the nature and construction of the door with which it mates. It will further be appreciated that, inasmuch as the inwardly projecting flanges 17, 25, 73 and 74 are only supported by the molding structure from which they are formed, these flanges will inherently have considerable resiliency which greatly aids in providing a satisfactory engagement of the guide strips with the window glass and serves to provide means for resiliently positioning the window and retaining the same in its own plane. It will be further appreciated that in the construction described herein, the conventional glass run channels usually found around window openings have been completely dispensed with, but that the essential structure for guiding the window during actuation is still retained.

Many other and further modifications of the present invention, falling within the scope thereof as defined in the subjoined claims, will be apparent to those skilled in the art.

I claim as my invention:

1. In the method of forming a vehicle door panel including a garnish molding, which consists in preforming a sheet of metal to form a door panel having a window opening therein, and a garnish molding around said window opening, and separating said garnish molding from said sheet.

2. In the method of forming a vehicle door panel including a garnish molding, which includes preforming a sheet of metal to form a door panel having a window opening, and an integral garnish molding around said window opening, separating said garnish molding from said sheet, and preforming the marginal edges of said stamping around said window opening to mate with said garnish molding.

3. In the method of forming a vehicle door panel including a garnish molding, which includes preforming a sheet of metal to form a window opening, forming said sheet to provide an integral garnish molding around said window opening, separating said garnish molding from said sheet, and forming a flange at the marginal edge of said window opening, said flange being adapted to mate with said garnish molding.

4. In the method of forming a vehicle door, the steps of, preforming a sheet of metal to form a window opening therein, forming said sheet to provide a garnish molding extending completely around said window opening, separating said garnish molding from said sheet and subsequently securing the same in position thereon.

5. In the method of forming a vehicle door, the steps of, preforming a sheet of metal to provide a jamb face portion of said door adjacent the edge of said sheet and a window in the upper portion of said sheet, said jamb face portion being wider adjacent said window opening, preforming the metal around the window opening to provide a garnish molding, severing said garnish molding from said sheet along the line of juncture of said sheet with the jamb face portion thereof, and securing a second panel to said jamb face portion.

6. In the method of forming a vehicle door, the steps of, preforming a sheet of metal to provide a jamb face portion of said door adjacent the edge of said sheet and a window in the upper portion of said sheet, said jamb face portion being wider adjacent said window opening, preforming the metal around the window opening to provide a garnish molding, severing said garnish molding from said sheet at the edge of said jamb face portion, bending the edge of said jamb face portion to provide a flange for seating said garnish molding, and securing a second panel to said jamb face portion.

7. In the method of forming a vehicle door, the steps of, preforming a sheet of metal to provide a jamb face portion of said door adjacent the edge of said sheet and a window in the upper portion of said sheet, said jamb face portion being wider adjacent said window opening, preforming the metal around the window opening to provide a garnish molding, severing said garnish molding, from said sheet at the edge of said jamb face portion, bending the edge of said jamb face inwardly around said window opening to provide a jamb face structure of substantially uniform width entirely around the door thus providing a flange around said window opening adapted to mate with said garnish molding, and securing a second panel to said jamb face portion.

8. In the method of forming a vehicle door, the steps of, stamping a garnish molding member simultaneously with, as an integral part of a door panel and subsequently severing said member from said panel, forming a second panel to mate with said first panel, and securing said second panel and garnish molding to opposite sides of said first panel.

9. In the method of forming a vehicle door, the steps of, stamping a garnish molding simultaneously with and as an integral part of a door panel, subsequently severing said member from said panel, deforming said panel adjacent the severed edge thereof to provide means for seating said garnish molding member, securing said member to said sealing means, forming a second panel, and securing said second panel to said first panel on the side opposite to that on which the garnish molding is secured.

10. In the method of forming a vehicle door panel including a garnish molding, which includes stamping a garnish molding simultaneously with and as an integral part of a door panel, subsequently severing said member from said panel, and deforming the severed edge of said panel to provide a flange adapted to mate with the peripheral edge portion of said garnish molding member.

CHARLES H. WIDMAN.